(12) United States Patent
Shindo et al.

(10) Patent No.: US 6,267,827 B1
(45) Date of Patent: Jul. 31, 2001

(54) NI-FE ALLOY SPUTTERING TARGET FOR FORMING MAGNETIC THIN FILMS, MAGNETIC THIN FILM, AND METHOD OF MANUFACTURING THE NI-FE ALLOY SPUTTERING TARGET

(75) Inventors: Yuichiro Shindo; Tsuneo Suzuki, both of Saitama (JP)

(73) Assignee: Japan Energy Corporation, Tokyo (JP)

( * ) Notice: Subject to any disclaimer, the term of this patent is extended or adjusted under 35 U.S.C. 154(b) by 0 days.

(21) Appl. No.: 09/266,259

(22) Filed: Mar. 11, 1999

(30) Foreign Application Priority Data

May 20, 1998 (JP) .................................................. 10-137876

(51) Int. Cl.$^7$ ..................................................... H01F 1/147
(52) U.S. Cl. ........................... 148/312; 148/310; 148/336; 148/459; 420/459
(58) Field of Search ..................................... 148/310, 312, 148/336, 409; 420/459; 204/298.12, 298.13, 192.2

(56) References Cited

U.S. PATENT DOCUMENTS

| | | | |
|---|---|---|---|
| 5,234,512 | * 8/1993 | Inoue et al. | ........................... 148/541 |
| 5,562,783 | * 10/1996 | Inoue et al. | ........................... 148/310 |
| 5,605,582 | * 2/1997 | Inoue et al. | ........................... 148/320 |
| 5,997,807 | * 12/1999 | Kuboi | ..................................... 420/94 |

FOREIGN PATENT DOCUMENTS 07-026369    1/1995   (JP) .

* cited by examiner

*Primary Examiner*—John Sheehan
(74) *Attorney, Agent, or Firm*—Howson and Howson

(57) ABSTRACT

An Ni—Fe alloy material suitable for forming a ferromagnetic Ni—Fe alloy thin film is provided. The magnetic thin film produces a small number of particles during sputtering, and excels in corrosion resistance and magnetic properties. A method of manufacturing an Ni—Fe alloy sputtering target used to make the thin film is also provided. In addition, an Ni—Fe alloy sputtering target for forming magnetic thin films is provided. The sputtering target is characterized in that it has: an oxygen content of 50 ppm or less; an S content of 10 ppm or less; a carbon content of 50 ppm or less, and a total content of metal impurities other than the alloy components of 50 ppm or less. Such an Ni—Fe alloy target can be produced by melting and alloying high-purity materials obtained by dissolving the raw materials in hydrochloric acid, and performing ion exchange, activated-charcoal treatment, and electrolytic refining.

8 Claims, No Drawings

NI-FE ALLOY SPUTTERING TARGET FOR FORMING MAGNETIC THIN FILMS, MAGNETIC THIN FILM, AND METHOD OF MANUFACTURING THE NI-FE ALLOY SPUTTERING TARGET

FIELD OF THE INVENTION

The present invention relates to an Ni—Fe sputtering target for forming magnetic thin films, and specifically to an Ni—Fe sputtering target for forming ferromagnetic thin films.

BACKGROUND OF THE INVENTION

In recent years, magnetic recording devices for computers, such as hard disks, have rapidly been downsized, and their capacities have been increased. The recording density of such devices is estimated to reach 20 $Gb/in^2$ in a few years. Therefore, conventional induction-type heads used as playing heads have approached their limit, and alternatively, magneto-resistance-effect-type (MR) heads have begun to be used. Use of the MR heads is expected to grow rapidly in the future in a worldwide scale accompanying the growth of the personal computer market. In coming years, the practical use of giant magneto-resistance-effect-type (GMR) heads, expected for their further higher density, will be realized.

Ni—Fe alloys have been studied for use as a ferromagnetic film of the spin-valve film used in GMR heads.

Ni—Fe alloys are normally produced by sintering or melting. However, conventional Ni—Fe alloys release a large amount of gases, produce a large number of particles during sputtering, and have the problem of corrosion resistance. Also, their magnetic properties are not found to be satisfactory.

OBJECT OF THE PRESENT INVENTION

It is an object of the present invention to provide means for forming a ferromagnetic film which releases less gases, produces fewer particles during sputtering, and has good magnetic properties.

SUMMARY OF THE PRESENT INVENTION

In order to solve the above problems, the inventors of the present invention repeated studies, and discovered that impurity elements, in particular, oxygen, sulfur, carbon, nitrogen, and hydrogen increased the release of gases and the production of particles, and that such impurities were the cause of lowered corrosion resistance. In addition to the above, the inventors discovered that the magnetic properties depended mainly on the crystalline structure of the thin film, and that the magnetic properties were improved when the crystals were large columnar crystals.

According to the present invention, and based on the above stated findings, an Ni—Fe alloy sputtering target for forming magnetic thin films is provided such that it has an oxygen content of 50 ppm or less, a sulfur content of 10 ppm or less, a carbon content of 50 ppm or less, and a content of total metal impurities other than the alloy components of 50 ppm or less. Preferably, the content of oxygen is 10 ppm or less, the content of sulfur is 1 ppm or less, the content of carbon is 10 ppm or less, and the content of total metal impurities other than the alloy components is 10 ppm or less.

In addition, the Ni—Fe alloy sputtering target has a nitrogen content of 10 ppm or less and a hydrogen content of 1 ppm or less. Preferably, the content of nitrogen is 1 ppm or less, and the content of hydrogen is 0.5 ppm or less.

According to another aspect of the present invention, a magnetic thin film formed by sputtering an Ni—Fe alloy target as described above is also disclosed.

According to yet another aspect of the present invention, a method of manufacturing the above discussed Ni—Fe alloy sputtering target is provided. The method includes the step of alloying by: melting high-purity Ni and high-purity Fe obtained by dissolving material Ni and Fe in hydrochloric acid to form an aqueous solution of chlorides; removing impurity metal ions by allowing the aqueous solution of chlorides to contact an ion exchange resin; evaporating to dryness or concentrating the obtained solution; dissolving it in water to form an aqueous solution of chloride having pH between 0 and 3; removing organic matters in the solution using activated charcoal; and conducting electrolytic refining of the aqueous solution as an electrolytic solution. The method also includes the step of casting the obtained alloy.

In addition, the method of manufacturing an Ni—Fe alloy sputtering target can include obtaining Ni or Fe by electrolytic refining and subjecting it to degassing.

DETAILED DESCRIPTION OF THE PREFERRED EMBODIMENT

An Ni—Fe alloy sputtering target for forming magnetic thin films according to the present invention comprises an Ni—Fe alloy containing 70% by weight or more Ni. Although typical examples are two-component alloys of Ni and Fe, the examples further include alloys also containing Co, Cr, Rh, Nb, or Ta.

In the Ni—Fe alloy sputtering target according to the present invention, the contents of impurities, i.e., elements other than Ni and Fe, are reduced. In particular, the contents of oxygen, sulfur, carbon, nitrogen, and hydrogen are reduced as much as possible, because such elements lower the corrosion resistance of the target, cause particles to occur, and deteriorate magnetic properties. Among these elements, oxygen and sulfur especially lower the corrosion resistance. Furthermore, since oxygen makes crystals finer and nitrogen deviates crystal orientation, both cause the deterioration of magnetic properties. Carbon also causes particles to occur. Therefore, the content of oxygen should be 50 ppm or below, preferably 10 ppm or below; the content of sulfur should be 10 ppm or below, preferably 1 ppm or below; and the content of carbon should be 50 ppm or below, preferably 10 ppm or below.

Furthermore, the content of nitrogen should be 10 ppm or below, preferably 1 ppm or below; and the content of hydrogen should be 1 ppm or below, preferably 0.5 ppm or below.

Exceeding the above contents is not preferred because of increase in occurrence of particles, significant lowering of corrosion resistance, and marked deterioration of magnetic properties.

The inventor of the present invention found that the impurities in the Ni—Fe alloy were originated from electrolytic Ni and Fe materials. The inventor carried out the high purification of each of the Ni and Fe materials.

By the combination of ion exchange and electrolytic refining, activated charcoal treatment, and degassing as required in the method for high purification of Ni and Fe materials, extremely high-purity Ni and Fe can be obtained.

For example, the following method can be used.

High-purity Ni and high-purity Fe can be obtained by: dissolving material Ni and Fe in hydrochloric acid to form an aqueous solution of chlorides; removing impurity metal ions by allowing the aqueous solution of chlorides to contact an ion exchange resin; evaporating to dryness or concentrating the obtained solution; dissolving the concentrated solution in water to form an aqueous solution of chloride having pH between 0 and 3; removing organic matters in the solution using activated charcoal; and conducting electrolytic refining of the aqueous solution as an electrolytic solution.

Although the purity of the Ni and Fe utilized are not particularly limited, those of three-nine purity (99.9%) which are normally marketed are sufficient.

The above Ni material, or Fe material, is charged in a vessel and dissolved in hydrochloric acid. The type of hydrochloric acid utilized is not particularly limited, for instance, industrial low purity hydrochloric acid may be used. This is because impurities contained in hydrochloric acid can also be removed by practicing the present invention.

Equipment for dissolving Ni or Fe is preferably provided by a cooling tower for the effective use of hydrochloric acid and a hydrogen chloride gas recovering unit. The material of the equipment is preferably quartz, graphite, Teflon, or polyethylene.

The dissolving temperature is 10 to 100° C. If the temperature is less than 10° C., the dissolving rate decreases, and if the temperature is more than 100° C., evaporation becomes vigorous and loss of the aqueous solution increases.

When Ni is highly purified, the Ni solution is extracted, concentrated, and adjusted to have a hydrochloric acid concentration of 5 to 12 N by adding hydrochloric acid. A hydrochloric concentration of less than 5 N, or more than 12 N, is not preferred because Co is not absorbed and removed by the ion exchange resin.

The above nickel chloride solution adjusted to have a hydrochloric acid concentration of 5 to 12 N is allowed to contact an anion exchange resin to absorb impurities in the solution. The ion exchange resin used in the present invention is not particularly limited if it is an anion exchange resin. Examples include DOWEX 1×8, DOWEX 2×8 (Muromachi Chemicals Co., Ltd.), and DIAION SA 10A.

Since Co, Fe, and U form chloride complexes in concentrated hydrochloric acid, and are present as anions, they are adsorbed on anion exchanged resins. On the other hand, since Ni and alkali metals such as Na, K and Th, present as impurities do not form chloride complexes, they are not adsorbed, but flow out of the column.

At this time, for proper separation of Ni and Co, the flow rate of the solution is preferably SV=0.01 to 1. Here, "SV" stands for space velocity, and is the quantity of the solution per hour divided by the volume of the packed ion exchange resin. If SV is 0.01 or less, the productivity decreases, and if SV is 1 or more, Fe and Co are not sufficiently adsorbed and high-purity Ni cannot be obtained.

Through the above operations, Co and U impurities are separated from Ni.

Co and U adsorbed on the anion exchange resin can be eluted easily by the use of hydrochloric acid of a concentration less than 1N. Therefore, the anion exchange resin can be recovered by eluting Co and U at a suitable time, considering the adsorption capacity of the anion exchange resin.

The purification of Fe can be performed in the same manner as the purification of Ni.

Since the nickel chloride, or iron chloride solution, eluted from the ion exchange resin has a high hydrochloric acid content, it cannot be used for electrolytic refining as it is. Therefore, by evaporating to dryness or concentrating the eluted nickel chloride, or iron chloride, solution and adding pure water, an aqueous solution of a pH between 0 and 3 is obtained and used as the electrolytic solution.

The evaporation to dryness, or concentration, step may be carried out with a rotary evaporator or the like. The temperature for evaporation to dryness or concentration is 80° C. or above, preferably 100°C. or above. A temperature below 80° C. is not preferred because evaporation to dryness or concentration takes a long time. Evaporation to dryness or concentration carried out with an aspirator under a weakly reduced pressure will reduce the time taken. The material of the equipment used for the evaporation to dryness or concentration step is preferably quartz, graphite, or Teflon. Hydrochloric acid gas produced during evaporation to dryness or concentration can be cooled and concentrated for reuse as hydrochloric acid for dissolving Ni or Fe.

Small quantities of organic substances (styrene, divinylbenzene, amines, etc.) may flow out of the ion exchange resin and mix in the solution. An activated charcoal treatment is carried out to remove such organic substances. Since activated charcoal may contain impurities, it is preferable to use activated charcoal after treating with an acid such as hydrochloric acid to remove such impurities. Although the activated charcoal treatment is normally carried out after the nickel chloride, or iron chloride, solution and water is added to adjust the pH to 0 to 3, the activated charcoal treatment is not necessarily carried out in this order, but may be carried out at any time between the ion exchange and electrolytic refining steps.

The pH of the electrolytic solution comprising the aqueous solution of high-purity Ni or high-purity Fe is 0 to 3, preferably 0.5 to 2. A pH below 0 is not preferred because a large quantity of hydrogen will be produced and current efficiency will decrease. A pH above 3 is also not preferred because Ni or Fe precipitates as nickel hydroxide or iron hydroxide.

The concentration of Ni or Fe in the electrolytic solution during electrolytic refining is 10 to 100 g/l, preferably 20 to 80 g/l. A concentration less than 10 g/l is not preferred because a large quantity of hydrogen will be produced, current efficiency will decrease, and the concentration of impurities in electrodeposited Ni or Fe will increase. A concentration more than 110 g/l is also not preferred because nickel chloride or iron chloride will deposit affecting the electrodeposited state.

The range of current densities are preferably between 0.01 and 10 $A/dm^2$. A current density less than 0.01 $A/dm^2$ is not effective, because the productivity will decrease. A current density more than 10 $A/dm^2$ is also not preferred because the concentration of impurities will increase and current efficiency will decrease.

Temperature during electrolysis is in a range between 10 and 90° C., preferably between 35 and 55° C. Temperature below 10° C. is not preferred because current efficiency will decrease, and temperature above 90° C. is also not preferred because the evaporation of the electrolytic solution will increase.

As the anode, crude Ni or crude Fe is used.

As the cathode, an Ni, Fe or titanium plate is used.

The material for the electrolytic vessel is preferably polyvinyl chloride, polypropylene, or polyethylene.

In electrolytic refining, it is preferred to isolate the cathode from the anode with a diaphragm or an anion exchange membrane, and to feed to the cathode side at least intermittently the aqueous solution of high-purity Ni or high-purity Fe (acting as the catholyte) refined by ion exchange and activated-charcoal treatment, so that impurities eluted from the anode do not migrate toward the cathode, and also to extract from the anode side at least intermittently the anolyte having a high impurity content. The quantity of the catholyte fed at this time is preferably the same or more than the quantity of the anolyte extracted.

The diaphragm or the anion exchange membrane available in the present invention is not particularly limited. Examples of diaphragms include Filter Cloth P-2020 and PP-100 (Azumi Filter Paper Co., Ltd.) and Tevylon 1010, and examples of anion exchange membrane include Ionac MA-3475 (Muromachi Chemical co., Ltd.).

The extracted anolyte can be recycled and reused by adjusting the hydrochloric acid concentration to 5 to 12 N, then allowing it to contact an anion exchange resin, whereby electrolytic refining can be carried out continuously.

For the purpose of the present invention, "at least intermittently" means "continuously or intermittently".

Thus a trace of Th, or alkali metals such as Na and K, remaining in the electrolytic solution after the above electrolytic refining can be separated from Ni or Fe.

By the heat treatment of recovered electrodeposited Ni or electrodeposited Fe in a reducing atmosphere, such as $H_2$, gas components such as oxygen can be removed. The temperature for the heat treatment is preferably 800 to 1550° C., and more preferably 100 to 1500° C. If the temperature is below 800° C., degassing takes a long time, while if the temperature is above 1550° C., Ni or Fe is partially melted to cause contamination from the crucible.

More preferably, electron-beam melting is performed. In electron-beam melting, an electrode (here, electrodeposited Ni or electrodeposited Fe) is first produced, and it is melted again to obtain high-purity ingots. Volatile components evaporate while an electrode is melted at a high temperature under a high vacuum. For example, when the melting quantity is 5 kg, electron-beam melting is performed under the following conditions: current: 0.7A; voltage: 20 kV; degree of vacuum: $10^{-5}$ mmHg; and time: 2 hr.

High-purity Ni and high-purity Fe obtained by the above methods are melted and alloyed, then cast. The obtained Ni—Fe alloy ingot is machined to fabricate a target for sputtering. Basically, the purity of the target is the same as the purity of the ingot.

By sputtering the thus obtained target, a magnetic thin film can be formed.

The Ni—Fe alloy magnetic thin film obtained by sputtering has the purity same as the purity of the target, that is, an oxygen content of 50 ppm or less, a sulfur content of 10 ppm or less, a carbon content of 50 ppm or less, and a total content of metal impurities other than alloy components of 50 ppm or less. Furthermore, the crystalline structure is columnar.

The magnetic properties of such a magnetic thin film are especially good because the crystalline structure is columnar.

Although the present invention is described below in detail referring to examples, the present invention is not limited to these examples.

EXAMPLE 1

Crude nickel lumps of a purity shown in Table 1 were placed in a dissolver, and charged in a vessel containing an 11.6 N aqueous solution of hydrochloric acid. The temperature was raised to 95° C. to form an aqueous solution of nickel chloride of a hydrochloric acid concentration of 9 N and a nickel concentration of 50 g/l.

This aqueous solution was passed through a polypropylene column (150 mm in diameter×1200 mm in length) packed with an anion exchange resin (DOWEX 2×8, Muromachi Chemicals Co., Ltd.) at SV=0.1 to adsorb and remove Co and U.

The obtained refined aqueous solution of nickel chloride was evaporated to dryness at 110° C. using a rotary evaporator. This was dissolved in pure water to make 10 liters of the solution. The nickel content at this time was about 50 g/l. After the pH was adjusted to 1, organic substances were removed by activated charcoal. This high-purity nickel solution was continuously added to the cathode chamber of the electrolytic vessel. The activated charcoal had been washed by 6 N hydrochloric acid to remove impurities such as Fe.

Next, electrolytic refining was carried out at a current density of $2A/dm^2$ and a temperature of 50° C. using a nickel plate as the cathode. At this time, the anode side was partitioned from the cathode side with a diaphragm (PP2020, Azumi Filter Paper Co., Ltd.). The aqueous solution of high-purity nickel chloride was fed to the cathode side at a rate of 1 liter/hour, and was extracted from the anode side at the same rate. In 40 hours, the yield of obtained electrodeposited product was 83%. The electrodeposited state was a flat surface free of unevenness, and no peeling of the electrodeposited nickel occurred.

On the other hand, Fe was purified in the same manner as Ni. This is, crude iron lumps of a purity shown in Table 1 were placed in an anode chamber, and charged in a vessel containing a 6 N aqueous solution of hydrochloric acid. The iron lumps were dissolved at 20° C. to form an aqueous solution of iron chloride of an iron concentration of 50 g/l.

This aqueous solution was passed through a polypropylene column (150 mm in diameter×1200 mm in length) packed with an anion exchange resin (DOWEX 2×8, Muromachi Chemicals Co., Ltd.) at SV=0.2 to adsorb Fe and remove Co and Ni. Then, pure water has Fe eluted.

The obtained refined aqueous solution of iron chloride was evaporated to dryness at 110° C. using a rotary evaporator. This was dissolved in pure water to make 10 liters of the solution. The iron content at this time was about 50 g/l. After the pH was adjusted to 2, organic substances were removed by activated charcoal. This high-purity Fe solution was continuously added to the cathode chamber of the electrolytic vessel. The activated charcoal had been washed by 6 N hydrochloric acid to remove impurities such as Fe.

Next, electrolytic refining was carried out at a current density of $2A/dm^2$ and a temperature of 50° C. using an iron plate as the cathode. At this time, the anode side was partitioned from the cathode side with a diaphragm (PP2020, Azumi Filter Paper Co., Ltd.). The aqueous solution of high-purity iron chloride was fed to the cathode side at a rate of 1 liter/hour, and was extracted from the anode side at the same rate. In 40 hours, the yield of obtained electrodeposited product was 90%. The electrodeposited state was a flat surface free of unevenness, and no peeling of the electrodeposited Fe occurred.

Furthermore, the obtained electrodeposited Ni and electrodeposited Fe were subjected to electron beam melting, and machined to fabricate a target for sputtering. The contents of impurities in electrodeposited Ni and electrodeposited Fe, and those after electron beam melting, are shown in Table 1.

TABLE 1

Example 1
Unit: ppm

|  | Material Ni | Electrodeposited Ni | EB Ni | Material Fe | Electrodeposited Fe | EB Fe | Ni-Fe alloy |
|---|---|---|---|---|---|---|---|
| Ni | Balance | Balance | Balance | 20 | 1 | 1 | 82% |
| Fe | 20 | 1 | 1 | Balance | Balance | Balance | 18% |
| O | 80 | 50 | 7 | 100 | 20 | 5 | 8 |
| N | 15 | 1 | <1 | 25 | 1 | <1 | <1 |
| C | 50 | 5 | 5 | 30 | 5 | 5 | 5 |
| S | 10 | <1 | <1 | 40 | <1 | <1 | <1 |
| H | 10 | 1 | 0.2 | 5 | 1 | 0.2 | 0.1 |
| Na | 40 | <0.1 | <0.1 | 5 | <0.1 | <0.1 | <0.1 |
| K | 1 | <0.1 | <0.1 | 5 | <0.1 | <0.1 | <0.1 |
| Cr | 0.5 | <0.1 | <0.1 | 5 | 1 | 1 | 0.5 |
| Cu | 25 | 5 | 3 | 1 | 1 | 0.5 | 2 |
| Al | 1 | <0.1 | <0.1 | 1 | 0.5 | 0.5 | 0.5 |
| Co | 25 | 5 | 5 | 50 | 10 | 10 | 8 |
| Ca | 0.1 | <0.1 | <0.1 | 1 | <0.1 | <0.1 | 1 |
| Mg | 0.1 | <0.1 | <0.1 | 1 | <0.1 | <0.1 | <0.1 |
| As | 1 | 0.5 | <0.1 | 1 | 0.5 | 0.1 | <0.1 |
| Pb | 2 | 0.1 | 0.1 | 2 | 1 | 1 | 0.5 |
| Si | 1 | <0.1 | <0.1 | 1 | <0.1 | <0.1 | <0.1 |
| Zn | 1 | <0.1 | <0.1 | 2 | <0.1 | <0.1 | <0.1 |
| Total of metal impurities | 97.7 | 11.4 | 9 | 75 | 14.6 | 13.7 | 13.1 |

The obtained refined Ni and refined Fe were melted and alloyed in a ratio of 82:18 in a CaO crucible. The contents of impurities contained in the resultant Ni—Fe alloy were, oxygen: 8 ppm, sulfur: less than 1 ppm, carbon: 5ppm, nitrogen: less than 1 ppm, hydrogen: 0.1 ppm, and total metal impurities other than Ni and Fe: 13.1 ppm.

The compositions of each material and the Ni—Fe alloy are also shown in Table 1.

This alloy ingot was machined to fabricate a disc-shaped target for sputtering having a diameter of 50 mm and a thickness of 5 mm. This target for sputtering was joined to a copper packing plate using an In—Sn alloy solder. Using magnetron sputtering equipment, an Ni—Fe alloy thin film was formed on a 3-inch Si wafer by sputtering. The number of particles having diameters of 0.3 μm or larger produced on the wafer during sputtering was counted. Furthermore, the observation of the cross-sectional structure of the thin film was conducted.

EXAMPLE 2

Operations of Example 1 were repeated except that activated charcoal without acid treatment was used. The purity of Ni and Fe obtained by these operations are shown in Table 2. It is found that the Fe content in Ni is high. If activated charcoal containing less Fe is used, this problem does not arise. Even if the Fe content is high, no problems arise when an Ni—Fe alloy is produced.

The obtained refined Ni and refined Fe were melted and alloyed in a ration of 82:18 in an $Al_2O_3$ crucible. The contents of impurities contained in the resultant N—Fe alloy were: oxygen: 20 ppm; sulfur: 1 ppm; carbon: 5 ppm; nitrogen: 4 ppm; hydrogen: 0.2 ppm; and total metal impurities other than Ni and Fe: 16 ppm.

The compositions of each material and the Ni—Fe alloy are also shown in Table 2.

TABLE 2

Example 1
Unit: ppm

|  | Material Ni | Electrodeposited Ni | EB Ni | Material Fe | Electrodeposited Fe | EB Fe | Ni-Fe alloy |
|---|---|---|---|---|---|---|---|
| Ni | Balance | Balance | Balance | 20 | 3 | 3 | 82% |
| Fe | 20 | 5 | 5 | Balance | Balance | Balance | 18% |
| O | 80 | 60 | 15 | 100 | 30 | 20 | 20 |
| N | 15 | 1 | 1 | 25 | 5 | 5 | 4 |
| C | 50 | 5 | 5 | 30 | 5 | 5 | 5 |
| S | 10 | 1 | 1 | 40 | 1 | 1 | 1 |
| H | 10 | 1 | 0.2 | 5 | 1 | 0.2 | 0.2 |
| Na | 40 | <0.1 | <0.1 | 5 | <0.1 | <0.1 | <0.1 |
| K | 1 | <0.1 | <0.1 | 5 | <0.1 | <0.1 | <0.1 |
| Cr | 0.5 | <0.1 | <0.1 | 5 | 1 | 1 | 0.5 |
| Cu | 25 | 5 | 3 | 1 | 1 | 0.5 | 2 |
| Al | 1 | <0.1 | <0.1 | 1 | 0.5 | 0.5 | 0.5 |
| Co | 25 | 5 | 5 | 50 | 10 | 10 | 8 |
| Ca | 0.1 | <0.1 | <0.1 | 1 | <0.1 | <0.1 | 1 |
| Mg | 0.1 | <0.1 | <0.1 | 1 | <0.1 | <0.1 | <0.1 |
| As | 1 | 0.5 | <0.1 | 1 | 0.5 | 0.1 | <0.1 |
| Pb | 2 | 0.1 | 0.1 | 2 | 1 | 1 | 0.5 |
| Si | 1 | 2 | 2 | 1 | 2 | 2 | 3 |
| Zn | 1 | 4 | <0.1 | 2 | <0.1 | 4 | <0.1 |
| Total of metal impurities | 97.7 | 17.2 | 10.9 | 75 | 16.5 | 19.5 | 16 |

A target for sputtering was fabricated as in Example 1 and subjected to the sputtering test. The number of particles on the wafer was counted, and the observation of the cross-sectional structure of the thin film was conducted.

COMPARATIVE EXAMPLE 1

Commercially available material Ni of three-nine purity (oxygen: 80 ppm, S: 10 ppm, C: 65 ppm, H: 10 ppm, N: 15 ppm, total impurity metal elements other than Ni and Fe: 97.7 ppm) and commercially available material Fe of three-nine purity (oxygen: 100 ppm, S: 40 ppm, C: 40 ppm, H: 5 ppm, N: 25 ppm, total impurity metal elements other than Ni and Fe: 75 ppm) were subjected to high-frequency melting and alloyed at a ratio of 82:18. As the result, an Ni—Fe alloy of impurity contents of: oxygen: 100 ppm; S: 30 ppm; C: 60 ppm; H: 2 ppm; N: 25 ppm; and total impurity metal elements other than Ni and Fe: 74.3 ppm was obtained.

The compositions of each material and the Ni—Fe alloy are also shown in Table 3.

TABLE 3

Comparative Example 1

Unit: ppm

|  | Material Ni | Material Fe | Ni—Fe alloy |
|---|---|---|---|
| Ni | Balance | 20 | 82% |
| Fe | 20 | Balance | 18% |
| O | 80 | 100 | 100 |
| N | 15 | 25 | 25 |
| C | 65 | 40 | 60 |
| S | 10 | 40 | 30 |
| H | 10 | 5 | 2 |
| Na | 40 | 5 | 10 |
| K | 1 | 5 | 1 |
| Cr | 0.5 | 5 | 3 |
| Cu | 25 | 1 | 15 |
| Al | 1 | 1 | 1 |
| Co | 25 | 50 | 40 |

TABLE 3-continued

Comparative Example 1

Unit: ppm

| | Material Ni | Material Fe | Ni—Fe alloy |
|---|---|---|---|
| Ca | 0.1 | 1 | 1 |
| Mg | 0.1 | 1 | <0.1 |
| As | 1 | 1 | <0.1 |
| Pb | 2 | 2 | 2 |
| Si | 1 | 1 | 1 |
| Zn | 1 | 2 | <0.1 |
| Total of metal impurities | 97.7 | 75 | 74.3 |

A target for sputtering was fabricated in the same manner as previously described in Examples 1 and 2 and subjected to the sputtering test. The number of particles on the wafer was counted, and the observation of the cross-sectional structure of the thin film was conducted.

The results of counting the number of particles in the sputtering test and the results of structure observation for Examples 1 and 2 and Comparative Example 1 are shown in Table 4.

TABLE 4

| | Number of particles | Thin film crystalline structure |
|---|---|---|
| Example 1 | 5 | Large columnar crystal |
| Example 2 | 30 | Columnar crystal |
| Comparative Example 1 | 140 | Isometric crystal |

The results showed that the Ni—Fe alloy target for sputtering for forming magnetic thin films according to the present invention, which had an oxygen content of 50 ppm or less, an S content of 10 ppm or less, a carbon content of 50 ppm or less, and a total content of metal impurities other than the alloy components of 50 ppm or less, produced fewer particles than the Comparative Example 1. The crystalline structure of the thin film was columnar.

In particular, the Ni—Fe alloy target for sputtering for forming magnetic thin films according to the present invention, which had an oxygen content of 10 ppm or less, an S content of 1 ppm or less, a carbon content of 10 ppm or less, and a total content of metal impurities other than the alloy components of 10 ppm or less, produced an extremely small number of particles. The thin film having crystalline structure of the large columnar crystals was able to be obtained.

Whereas, the thin film obtained using a target of the Comparative Example 1 produced a large number of particles, the crystalline structure was fine isometric crystals, and the magnetic properties were unsatisfactory.

By the use of the Ni—Fe alloy sputtering target for forming magnetic thin films according to the present invention, which has an oxygen content of 50 ppm or less, an S content of 10 ppm or less, a carbon content of 50 ppm or less, and a total content of metal impurities other than the alloy components of 50 ppm or less, a magnetic film producing a small number of particles, and having good magnetic properties can be formed. The Ni—Fe alloy sputtering target according to the present invention is useful as the material for forming magnetic thin films.

What is claimed is:

1. A device for forming magnetic thin films comprising a sputtering target being made from an Ni—Fe alloy and consisting of Ni, Fe, a content of oxygen of 50 ppm or less, a content of sulfur of 10 ppm or less, a content of carbon of 50 ppm or less, and a content of total metal impurities other than Ni and Fe of 50 ppm or less.

2. An Ni—Fe alloy sputtering target according to claim 1, wherein said content of oxygen is 10 ppm or less, said content of sulfur is 1 ppm or less, said content of carbon is 10 ppm or less, and said content of total metal impurities other than the alloy components is 10 ppm or less.

3. An Ni—Fe alloy sputtering target according to claim 1, further comprising a content of nitrogen of 10 ppm or less, and a content of hydrogen of 1 ppm or less.

4. An Ni—Fe alloy sputtering target according to claim 2, further comprising a content of nitrogen of 10 ppm or less, and a content of hydrogen of 1 ppm or less.

5. An Ni—Fe alloy sputtering target according to claim 3, wherein said content of nitrogen is 1 ppm or less, and said content of hydrogen is 0.5 ppm or less.

6. An Ni—Fe alloy sputtering target according to claim 4, wherein said content of nitrogen is 1 ppm or less, and said content of hydrogen is 0.5 ppm or less.

7. A magnetic thin film formed by sputtering said Ni—Fe alloy sputtering target according to claim 1.

8. A thin film comprising a sputtered magnetic thin film formed by a sputtering target, said sputtered magnetic thin film having a columnar crystalline structure, being made of an Ni—Fe alloy, and consisting of Ni, Fe, a content of oxygen of 50 ppm or less, a content of sulfur of 10 ppm or less, a content of carbon of 50 ppm or less, and a content of total metal impurities other than Ni and Fe of 50 ppm or less.

* * * * *